Patented Mar. 1, 1938

2,109,458

UNITED STATES PATENT OFFICE 2,109,458

ARALKYL ETHERS OF ACYL-PHENOLS

Shailer L. Bass and Edward M. Van Duzee, Midland, Mich., assignors to The Dow Chemical Company, Midland, Mich., a corporation of Michigan No Drawing. Application September 23, 1936, Serial No. 102,173

6 Claims. (Cl. 260—131)

The present invention concerns a new class of compounds, namely, the aralkyl ethers of acyl-phenol compounds. The compounds with which this application is particularly concerned have the following structural formula:

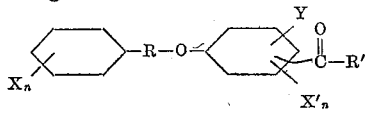

wherein X and X' each represent halogen or hydrogen, $n$ is an integer not greater than 2, R represents an alkylene radical, R' represents an alkyl group, and Y represents hydrogen or an alkyl, cyclo-alkyl, aryl, or aralkyl group.

We have prepared compounds of the aforementioned class, determined certain physical properties thereof whereby they may be readily identified, and found that they are particularly useful as intermediates for the manufacture of pharmaceuticals, as lubricant addition agents, and as plasticizing agents for cellulose derivatives, such as ethyl cellulose, cellulose acetates, etc. The invention, then, lies in the new products hereinafter fully described and particularly pointed out in the claims.

Our new compounds can be prepared by treating the alkali metal salt of an acyl-phenol directly with an aralkyl chloride or bromide.

For example, an acyl-substituted phenol compound is added to an alcoholic solution of metallic sodium, thereby producing an alcoholic solution of the sodium salt of said acyl-phenol. An aralkyl halide is then introduced slowly into such sodium phenolate solution, maintained at its refluxing temperature, to form the desired ether product. If the crude reacted mixture should be a solid, it is thoroughly washed with several volumes of water to remove unreacted phenolate and sodium chloride, and is thereafter recrystallized from a suitable organic solvent to isolate the desired ether product in substantially pure form. In case, however, the reacted mixture is an oil, it is cooled and diluted with several volumes of water to precipitate a crude ether product, which may be recovered in any convenient manner, such as by extraction with an organic solvent, decantation, etc. The crude product so obtained is washed with water and purified, as by distillation or fractional crystallization, to obtain the desired ether free from impurities.

The acyl-phenol compounds employed as starting materials in the above-described procedure are conveniently prepared from the corresponding phenyl esters by rearrangement of the same with aluminum chloride in a suitable organic medium, e. g. nitrobenzene, etc.

The following examples described in detail the preperation of certain specific members of our new class of compounds, but are offered only to illustrate the invention and are not to be construed as limiting the same.

*Example 1.—Benzyl ether of 4-acetyl-phenol*

23 grams (1 mole) of metallic sodium was digested with 500 milliliters of absolute alcohol, and 136.1 grams (1 mole) of 4-acetyl-phenol was reacted with the resulting alcoholate solution to form an alcoholic solution of sodium 4-acetyl-phenolate. This solution was warmed to its refluxing temperature and 126.5 grams (1 mole) of benzyl chloride added thereto over a period of 1 hour. Refluxing was continued thereafter for 1 hour under atmospheric pressure, after which the reaction mixture was cooled, whereupon the crude reaction product crystallized out as a porous mass. This solid product was broken up to form a slurry with the alcoholic reaction medium, approximately 3 volumes of water added thereto, and the entire suspension filtered to isolate the solid product of reaction. This crude ether compound was washed with water and recrystallized from hot ethyl alcohol, whereby there was obtained 169.5 grams (0.749 mole) of the benzyl ether of 4-acetyl-phenol as a white, crystalline solid melting at 93° to 94° C.

*Example 2—Benzyl ether of 4-propionyl-phenol*

In a similar manner 10.1 grams (0.436 mole) of metallic sodium, 63.5 grams (0.436 mole) of 4-propionyl-phenol, and 55.3 grams (0.436 mole) of benzyl chloride were reacted together in 500 milliliters of alcohol and the crude reaction product resulting therefrom recrystallized from hot alcohol. 91 grams (0.375 mole) of the benzyl ether of 4-propionyl-phenol was obtained thereby as a white, crystalline solid melting at 94.5° to 96° C.

*Example 3—Benzyl ether of 3-acetyl-phenol*

25.1 grams (0.185 mole) of 3-acetyl-phenol, 23.4 grams (0.185 mole) of benzyl chloride, and 4.26 grams (0.185 mole) of metallic sodium were reacted together in 275 milliliters of absolute alcohol in the above-described manner. The crude reaction mixture was then cooled and diluted with approximately 3 volumes of water, whereupon an alkali-insoluble oil separated out of the alcoholic solution. This oil was extracted with benzene, the extract washed with water to remove suspended sodium chloride, filtered, and the benzene removed by distillation at atmospheric pressure. The dark, viscous residue obtained thereby was fractionally distilled under reduced pressure, whereby 20.97 grams (0.093 mole) of the benzyl ether of 3-acetyl-phenol was obtained as a water-white liquid boiling between 184° and 188° C. at 3 millimeters pressure and having a specific gravity of 1.140 at 20°/4° C.

Example 4—Benzyl ether of 2-acetyl-4-phenyl-phenol 0.353 mole each of metallic sodium, 2-acetyl-4-phenyl-phenol, and benzyl chloride were reacted together at 250 milliliters of absolute alcohol substantially as described in Example 1. The resulting crude reaction product was diluted with water, extracted with benzene, and the benzene removed therefrom by distillation at atmospheric pressure. The residue from the benzene distillation solidified and was recrystallized from benzene to obtain 71.5 grams (0.236 mole) of the benzyl ether of 2-acetyl-4-phenyl-phenol as a white, crystalline product melting at 136° to 137.5° C.

Example 5—Benzyl ether of 2-acetyl-4-phenyl-6-chloro-phenol

In a similar manner 0.396 mole each, that is, 9.1 grams, of sodium, 97.7 grams of 2-acetyl-4-phenyl-6-chloro-phenol, and 50.1 grams of benzyl chloride, were reacted together and the resulting crude reaction product recrystallized successively from benzene and alcohol. 72 grams (0.24 mole) of the benzyl ether of 2-acetyl-4-phenyl-6-chloro-phenol was obtained thereby as a white, crystalline product melting at 91°–92° C.

Example 6—Benzyl ether of 2-phenyl-4-acetyl-phenol 4.9 grams of metallic sodium, 45.0 grams of 2-phenyl-4-acetyl-phenol, and 26.8 grams of benzyl chloride (that is, 0.212 mole of each) were reacted together in 250 milliliters of alcohol, substantially as described in Example 3. Fractional distillation of the benzene extract obtained thereby resulted in the isolation of 31.5 grams (0.148 mole) of the benzyl ether of 2-phenyl-4-acetyl-phenol as a water-white, viscous oil boiling at 180°–182° C. at 3 millimeters pressure and having the specific gravity 1.129 at 20°/4° C.

If desired, the foregoing procedures may be modified by reacting the phenol compound and aralkyl halides in the presence of an aqueous or aqueous-alcoholic solution of sodium hydroxide. Similarly, other suitable alkali, such as potassium or potassium hydroxide may be substituted for sodium in the above examples.

When aralkyl halides and acyl-phenol compounds other than those employed in the foregoing examples are substituted therefor, compounds such as the following are produced: 4-chloro-benzyl ether of 2-acetyl-phenol, 2-bromo-benzyl ether of 2-methyl-4-acetyl-phenol, 2.4 dichloro-benzyl ether of 2-acetyl-4-tertiary-butyl-phenol, beta-phenyl-ethyl ether of 2-chloro-4-acetyl-phenol, 4-chloro-phenyl-propyl ether of 2-chloro-4-acetyl-6-methyl-phenol, 3-bromo-phenyl-amyl ether of 2-butyryl-4-bromo-6-isopropyl-phenol, phenyl-hexyl ether of 2-butyryl-4-bromo-2-isopropyl-phenol, phenyl-hexyl ether of 4-valeryl-phenol, 3-chloro-phenyl-heptyl ether of 2-phenyl-4-hexanoyl-phenol, phenyl-octyl ether of 2-cyclohexyl-4-heptanoyl-phenol, benzyl ether of 2-octanoyl-4-benzyl-phenol, benzyl ether of 4-duodecanoyl-phenol, phenyl-butyl ether of 4-hexa-decanoyl-phenol, 4-bromo-phenyl-ethyl ether of 4-octadecanoyl-phenol, benzyl ether of 2-acetyl-4-phenyl-6-bromo-phenol, 2-chloro-benzyl ether of 2-acetyl-4.6-dichloro-phenol, etc.

Other modes of applying the principle of our invention may be employed instead of those explained, change being made as regards the materials employed, provided the products described in the following claims be thereby obtained.

We therefore particularly point out and distinctly claim as our invention.

1. A benzyl ether of an acyl-hydroxy-diphenyl compound having the formula:

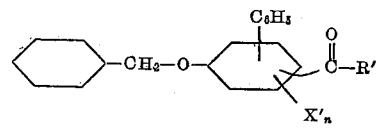

wherein X' represents a substituent selected from the group consisting of halogen and hydrogen, $n$ is an integer not greater than 2, and R' represents an alkyl radical.

2. A benzyl ether of an acetyl-hydroxy-diphenyl compound having the formula:

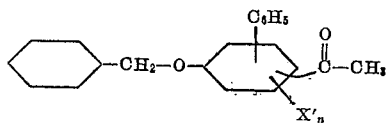

wherein X' represents a substituent selected from the group consisting of halogen and hydrogen, and $n$ is an integer not greater than 2.

3. A benzyl ether of an acetyl-hydroxy-diphenyl having the formula:

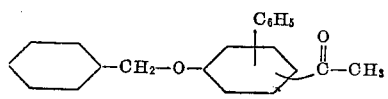

4. An aralkyl ether of an acyl-hydroxy-diphenyl compound having the formula

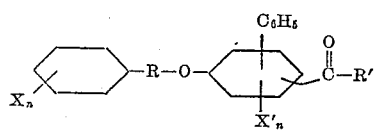

wherein X and X' each represent a substituent selected from the group consisting of halogen and hydrogen, each $n$ is an integer not greater than two, R represents an alkylene radical, and R' represents an alkyl radical.

5. An aralkyl ether of an acyl-hydroxy-diphenyl compound having the formula

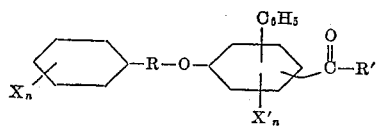

wherein X and X' each represent a substituent selected from the class consisting of halogen and hydrogen, each $n$ is an integer not greater than two, R represents an alkylene radical containing from 1 to 8 carbon atoms inclusive, and R' represents an alkyl radical.

6. An aralkyl ether of an acyl-hydroxy-diphenyl compound having the formula

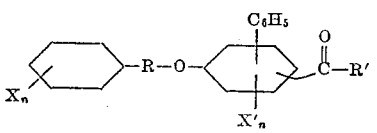

wherein X and X' each represents a substituent selected from the class consisting of halogen and hydrogen, each $n$ is an integer not greater than two, R represents an alkylene radical containing from 1 to 8 carbon atoms inclusive, and R' represents an alkyl radical containing from 1 to 17 carbon atoms inclusive.

SHAILER L. BASS.
EDWARD M. VAN DUZEE.